(12) United States Patent
Bauer et al.

(10) Patent No.: US 6,442,407 B1
(45) Date of Patent: Aug. 27, 2002

(54) MOBILE RADIO TELEPHONE SET

(75) Inventors: Harald Bauer, Nürnberg; Andreas Bening, Röthenbach/Pegnitz; Peter Kempf, Nürnberg, all of (DE)

(73) Assignee: Koninklijke Philips Electronics N.V. (NL)

( * ) Notice: Subject to any disclaimer, the term of this patent is extended or adjusted under 35 U.S.C. 154(b) by 0 days.

(21) Appl. No.: 09/123,031

(22) Filed: Jul. 27, 1998

(30) Foreign Application Priority Data

Aug. 2, 1997 (DE) .......................... 197 33 530

(51) Int. Cl.[7] ................................ H04M 1/00
(52) U.S. Cl. ....................... 455/574; 455/343
(58) Field of Search ................. 455/550, 574, 455/575, 343, 38.3, 38.1, 572, 181.1, 231

(56) References Cited

U.S. PATENT DOCUMENTS

| 4,384,361 A | * | 5/1983 | Masaki ..................... 455/31.1 |
| 4,731,814 A | * | 3/1988 | Becker et al. .............. 455/411 |
| 4,823,292 A | * | 4/1989 | Hillion ....................... 713/321 |
| 4,965,820 A | * | 10/1990 | Sharpe et al. .............. 370/277 |
| 5,058,203 A | * | 10/1991 | Inagami ..................... 455/574 |
| 5,487,181 A | * | 1/1996 | Dailey et al. .............. 455/575 |
| 5,539,891 A | * | 7/1996 | Childers et al. .............. 711/5 |
| 5,799,256 A | * | 8/1998 | Pombo et al. .............. 455/574 |
| 5,999,830 A | * | 12/1999 | Taniguchi et al. .......... 455/574 |
| 6,009,319 A | * | 12/1999 | Khullar et al. .............. 455/343 |
| 6,061,564 A | * | 5/2000 | Akeda ........................ 455/435 |
| 6,088,576 A | * | 7/2000 | Sone ......................... 455/38.3 |
| 6,198,820 B1 | * | 3/2001 | Tetsushi ..................... 379/413 |

FOREIGN PATENT DOCUMENTS

EP 0343528 A2 11/1989

* cited by examiner

Primary Examiner—Dwayne Bost
Assistant Examiner—Joy K. Contee
(74) Attorney, Agent, or Firm—Dicran Halajian

(57) ABSTRACT

The invention discloses a mobile radio telephone set including at least one control processor and at least one signal processor which are at least occasionally not in an active mode. To reduce the energy consumption of the mobile radio telephone set in the simplest manner possible, a control unit selects operating modes at least for the control processor and/or the signal processor. By utilizing a separate control unit, more particularly two or more coupled processors or other switching units of the whole mobile radio telephone set may be controlled independently. Each coupled unit may at once individually be set to its own operating mode to operate only the currently necessary units in this manner and reduce the energy consumption in this manner.

13 Claims, 3 Drawing Sheets

MOBILE RADIO TELEPHONE SET

BACKGROUND AND SUMMARY

DESCRIPTION

The invention relates to a mobile radio elephone set comprising at least one control processor and at least one signal processor which are at least occasionally not in an active mode.

Such a mobile radio telephone set is known from EP 0 343 528 in which a battery-operated mobile telephone is described which comprises mainly a control section and a radio section. The control section comprises a processor unit which carries out first control functions and a logic LSI unit (Large Scale Integration) for second control functions. The first control functions are often not used then, but are complicated and require a high supply rate. The second control functions are constantly used and often work at a low supply rate. To reduce the energy consumption of the mobile telephone, the processor unit always carries out the first control functions only when a function is to be carried out. In the rest of the time the processor unit is in the stop mode (column 4, lines 17–28). If necessary, the LSI unit intermittently adds thereto the processor unit by switching-on a high supply rate. For this purpose, the LSI unit is to use part of its capacity for continuous active monitoring of the processor unit in that the necessity of the processor unit is queried (see FIG. 2 with associated description, column 4, lines 29–34). Furthermore, the processor unit cannot become active by itself because a fast supply rate is directly required, but is to wait for an assignment by the LSI unit. More particularly in the case of a plurality of processors operating independently of each other, the monitoring of the individual units in mobile telephones according to the state of the art is very costly and not the most favorable solution as regards energy consumption of the mobile telephone.

Therefore, it is an object of the invention to reduce in a most simple manner the energy consumption in a mobile radio telephone set.

The object is achieved according to the invention in that a control unit selects operating modes at least for the control processor and/or the signal processor. When a separate control unit is used, particularly two or more coupled processors or other circuit elements of the whole mobile radio telephone set may be controlled independently of each other. Each coupled unit may directly be set to its own operating mode to thus drive only the units that are currently necessary and thus reduce the energy consumption. The control unit may then be realized preferably by a hardwired combinatorial and clocked logic which works in a highly energy-saving manner. But also any other realization offers the advantage according to the invention without leaving the scope of protection of the main claim.

In an advantageous embodiment of the invention at least the control processor or the signal processor comprises at least two sub-blocks and the control unit selects an operating mode by switching on/off at least one sub-block. The processors (or other circuit units) of the mobile radio telephone set may be formed by of separate sub-blocks (usually at least by processor core and input/output unit or interface) which may each be switched separately.

In an extension of the mobile radio telephone set according to the invention at least the control processor or the signal processor transmits request signals to the control unit by signal buses. The processors are coupled to the control unit by signal buses. By transmitting request signals on the signal bus which signals may contain, for example, certain signal combinations, the processors (or other circuit units) request a certain operating mode. The operating modes are featured by the sub-blocks that are switched on or off, respectively.

In one embodiment the control unit selects the operating modes in dependence on the request signals by switching on/off the supply clocks for the sub-blocks. As the sub-blocks especially in mobile radio telephone sets are usually clocked processors, an energy-saving operating mode is achieved especially by switching off the supply rates. Since each sub-block receives its own supply clock, the respective sub-block may be switched on or off by switching the supply clocks on or off and thus the various operating modes can be set for the processors and thus also for the whole mobile radio telephone set.

In a highly suitable embodiment of the invention, at least one processor includes as sub-blocks at least one processor core supplied with a core clock and at least one interface supplied with an interface clock Logical operations and calculations are carried out in the processor core. The interface is the general input/output unit (I/O unit) of the processor which processes all the tasks in correlation with the communication with other units of the mobile radio telephone set. Both sub-blocks are clocked units and are supplied with a clock by separate transmission lines irrespectively of each other. The frequency of the core clock may then also deviate from that of the interface clock.

For a further embodiment of the invention at least one wake-up counter monitors an operating mode of at least one processor, which operating mode is featured by a switched-off core clock and interface clock, and transmits a respective request signal for changing to an active mode of at least one processor which active mode is featured by a switched-on core clock and interface clock. Wake-up counters are clocked counters which are usually written with a value (wake-up value) and then decremented for initiating actions at specific counts. The wake-up value indicates the time in which the assigned processor is not used and may therefore be set to a stop mode or sleep mode by switching off the sub-blocks. More particularly in mobile radio telephone sets for TDMA mobile radio systems the wake-up value is in many cases a multiple of the frame in which the data transmission is organized. In this manner, control operations may be initiated inside the mobile radio telephone set in dependence on the count. For example, the processor is activated when the count is "zero", whereas the power supply for memories (ROM) coupled to this processor is switched on already three frames earlier, so that a steady state is found at the wake-up instant. For this purpose, one or more registers are assigned to a wake-up counter, which registers may be programmed with certain counts. A comparator compares the current count with the register contents and when they match causes a respective request signal to be sent to the control unit by the signal bus. The control unit switches on the required unit of the mobile radio telephone set in accordance with the request signal (first the supply clock for the memory and in the case of the respective request signal for the processor). In addition to the wake-up counter, the procedure for switching on a processor may be initiated by an interrupt if there is an unforeseen event (for example, a connection set-up to or from another subscriber). This procedure is then controlled by the control unit preferably after a request signal from the interface.

In a preferred embodiment of the invention the control unit switches off a reference clock for all the coupled processors when the core clock and interface clock are switched off. When all the processors for which the control unit selects the operating mode by switching on/off sub-blocks are not needed, also the oscillator which produces the reference clock may be switched off. The supply clocks are recovered from the reference clock which supply clocks are switched on/off for the individual sub-blocks by the control unit. More particularly, when sub-blocks are switched off, a distinction may be made between the two operating modes, the stop mode and sleep mode of the processors, the sleep mode being characterized in that, additionally, it is also permitted to switch off the reference clock.

These and other aspects of the invention will be apparent from and elucidated with reference to the embodiments described hereinafter.

DETAILED DESCRIPTION OF INVENTION

Figure 1:
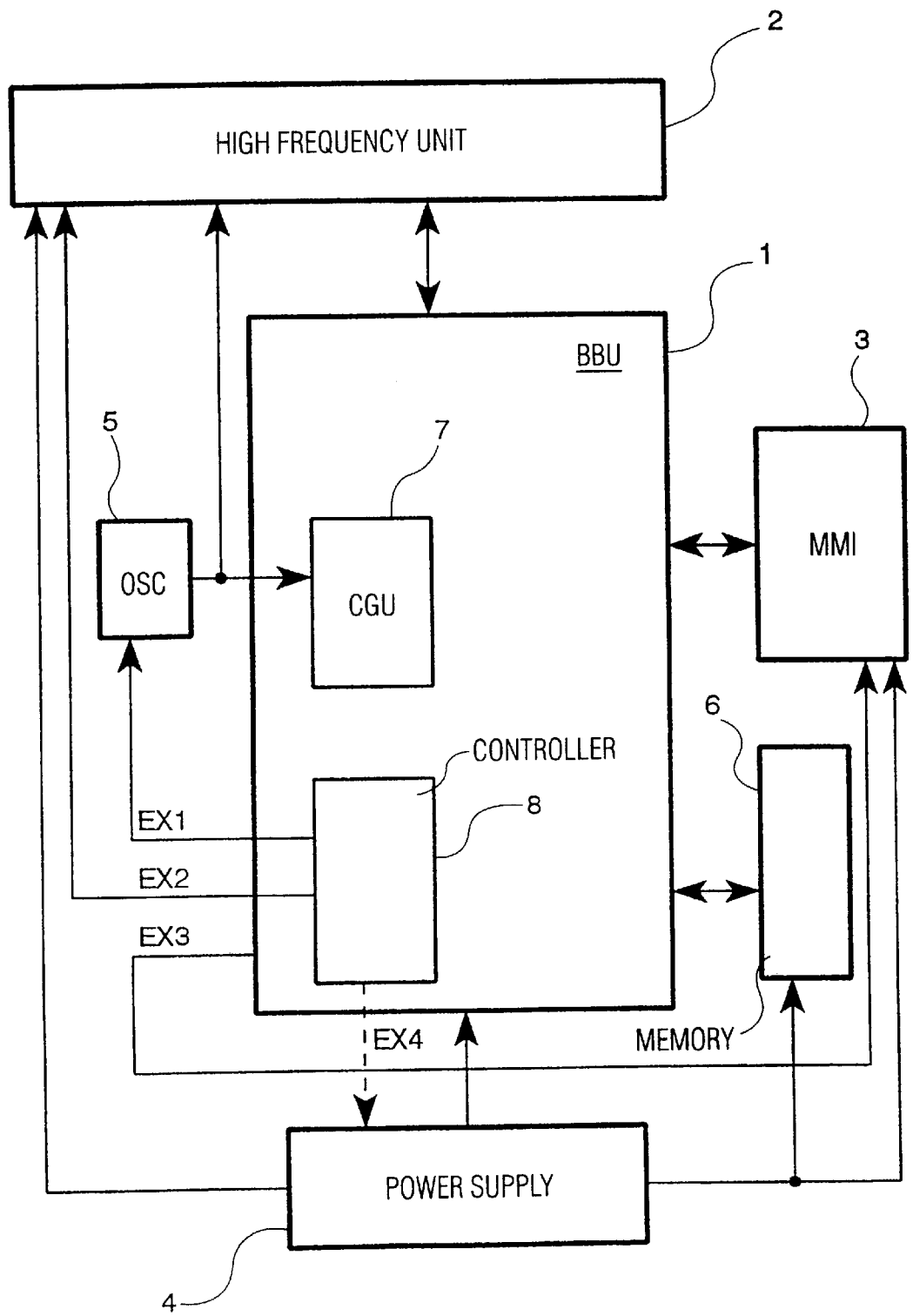
FIG. 1 shows a block circuit diagram of a mobile radio telephone set.

The mobile radio telephone set shown in FIG. 1 comprises a BaseBand Unit (BBU) 1, a high-frequency unit 2, a Man Machine Interface (MMI) 3 and a power supply 4 which are coupled in the manner indicated by the arrows. Furthermore, a memory 6 is provided and an oscillator 5 which is connected to a Clock Generation Unit CGU 7. A control unit 8 in the BBU 1 is connected via lines EX1, EX2 and EX3 to the oscillator 5, the HF unit 2 and the MMI 3 respectively, and optionally by a line EX4 (dashed arrow) to the power supply 4.

The power supply 4 produces a voltage for the HF unit 2, the MMI 3, the BBU 1 and the memory 6. The BBU 1 is used for processing the data to be transmitted by a mobile radio system to the HF unit 2, the memory 6 and the MMI 3 to which particularly at least a microphone and a loudspeaker belong (see double-headed arrow in FIG. 1). The oscillator 5 supplies the reference clock REFCLK to the HF unit 2 and the CGU 7.

Figure 2:
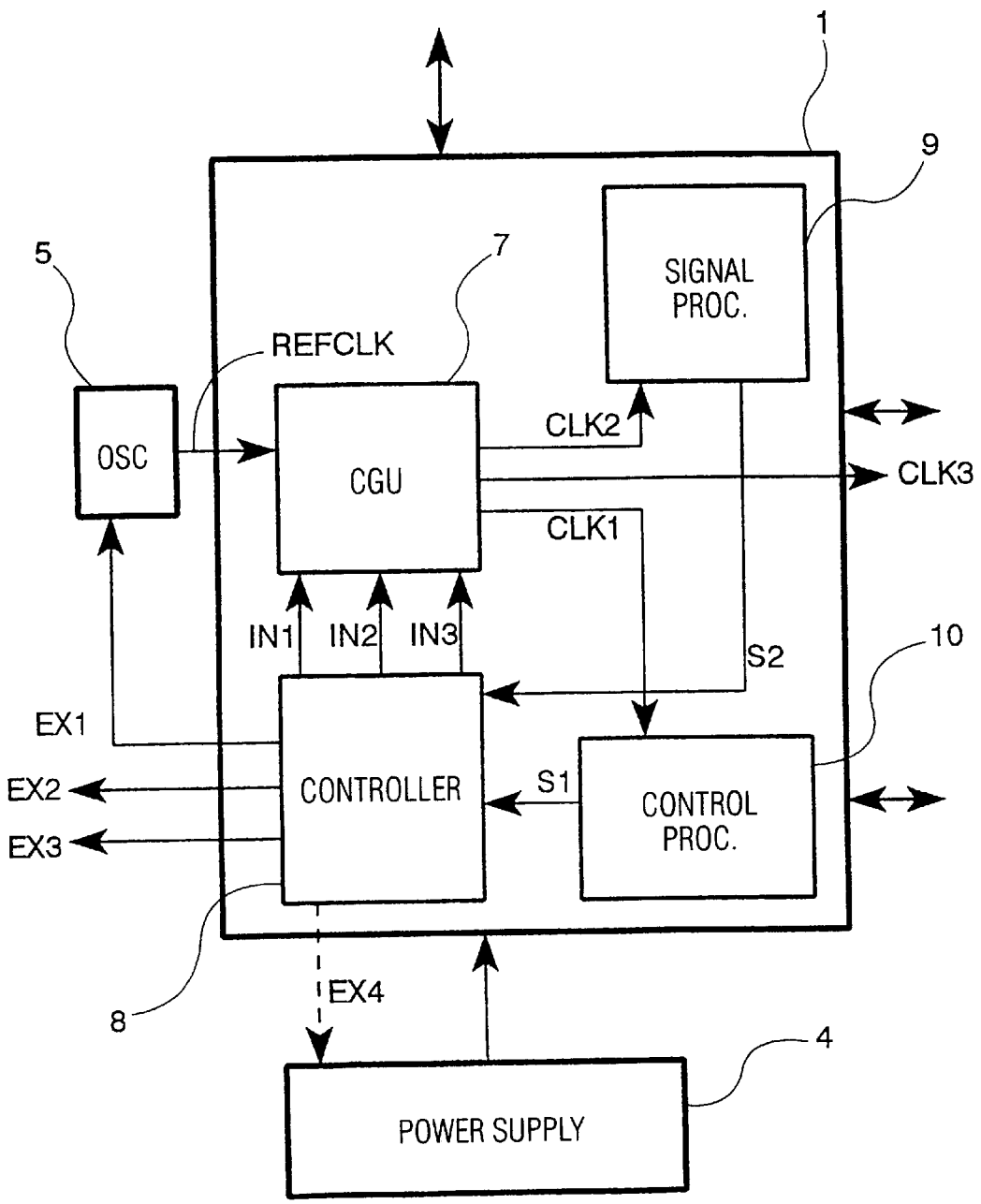
FIG. 2 shows a detailed block circuit diagram of a baseband unit of the mobile radio telephone set including two processors and one coupled control unit.

In FIG. 2, the baseband unit 1 is shown in more detail. A signal processor 9 for the baseband signal processing and a control processor 10 for the system control receive from the CGU 7 a supply clock CLK 2 and CLK 1 which are derived from the reference clock REFCLK. The additional clock line denotes that further independent units in the mobile radio telephone set may be operated with a supply clock CLK 3. Over the signal buses S1 and S2 the processors transmit their request signals to the control unit 8 which signals may also be formed by signal combinations for the supply clock CLK 1 or CLK 2 needed. A clocked and combinatorial logic in the control unit 8 forms external and internal control signals EX1, EX2, EX3, EX4 and IN1, IN2, IN3 in dependence on the request signals. The internal control signals IN1, IN2, IN3 are assigned to switches for the supply clocks CLK1, CLK2 and CLK3. The external control signal EX1 switches off as required the reference clock REFCLK of the oscillator 5. By way of the external control signals EX2 and EX3 the HF unit 2 or the MMI 3 respectively, may be controlled. The power supply 4 may additionally be controlled by the control unit 8 by way of the external control signal EX4. As a result, the height of the power may be controlled in dependence on the supply clock frequencies necessary for the actual operating mode, so that a minimum energy consumption of the mobile radio telephone set is achieved.

Figure 3:
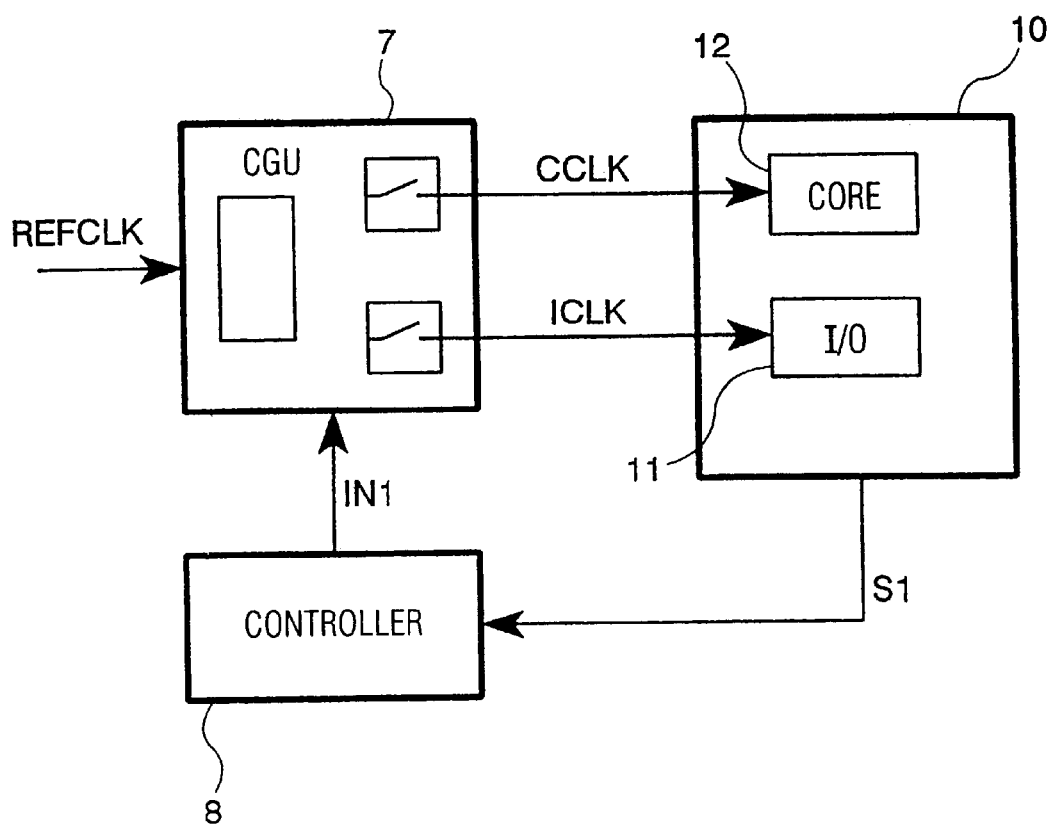
FIG. 3 shows a block circuit diagram for representing the selection of operating modes by switching on/off supply clocks for sub-blocks in a control processor.

FIG. 3 represents the selection of an operating mode for a processor by switching on/off sub-blocks on the basis of the control processor 10. The control processor 10 comprises the processor core 12 of the sub-blocks and interface (10 unit) 11, while each input/output unit may be used for the interface 11. The processor core 12 and the interface 11 are supplied with a switchable core clock CCLK or an interface clock ICLK, respectively. For operating the mobile radio telephone set in the most current-saving manner, all the units which are not necessary are to be switched off immediately. The power consumption may then be reduced by the switching off of supply clocks. The processors 9, 10 have various operating modes which are characterized by the current use of their sub-blocks 11, 12. In the active operating mode (active mode), both the core clock CCLK and the interface clock ICLK are switched on. Once a core 12 recognizes that it is not required for a brief period of ctime (for example, less than 1 TDMA frame according to the GSM standard), or when it waits for data from the interface 11, it switches off the core clock CCLK via a respective request signal. This idle mode is received in a software-controlled manner. In the case of an interrupt from the interface 11 which is still clocked, for example when data are received, the core clock CCLK is switched on again. When the processor 10 is not required for a rather long period of time (for example, for several TDMA frames according to the GSM standard), it adopts a stop mode in which both the core clock CCLK and the interface clock ICLK are switched off after a request signal. In a sleep mode the processor 10 additionally permits the similar stop mode that further autonomous or external units such as the oscillator 5 may be switched off. Since no rapid supply clock is switched on anymore, also the power supply 4 for the mobile radio telephone set may be reduced to a smaller value by means of the external control signal EX4. As a result, the power consumption in the mobile radio telephone set is reduced to a minimum. However, a rather long time of the sleep mode is necessary because of steady-state operations (reference clock REFCLK of the oscillator 5 and constant voltage from the power supply 4), until the processor 10 is again in the active mode for the processing of data.

Each processor is changed by a separate wake-up counter from an operating mode in which the core clock CCLK and the interface clock ICLK are switched off to the active mode. When the processor 10 recognizes that it is not required for a certain period of time, a wake-up value that corresponds to this period of time is written on the counter. The wake-up counter is decremented and produces a request signal for the supply clocks CCLK and ICLK when its count is "zero". The wake-up counter is then arranged inside the processor 10, but may also be integrated with the control unit 8 or be realized separately. When the count "zero" is reached, the control unit 8 supplies an internal control signal IN1 to the CGU 7 in which the supply clocks are switched on. Additionally, there may be registers arranged in the control unit 8 whose contents are programmed with a certain count. A comparator generates a request signal for certain supply clocks when the contents correspond to the count of the wake-up counter. For waking up from the sleep mode, two registers are provided in the example of embodiment which are programmed with a value that corresponds to 3 or 7 TDMA frame lengths in mobile radio according to the GSM standard. As a result, the oscillator 5 is switched on by the external control signal EX1 7 frames ahead of the switching-on of the core clock CCLK and interface clock ICLK, so that the reference clock REFCLK may respond. 3 frames before the processor is set to the active mode the power supply is switched on for the coupled memory.

What is claimed is:

1. A mobile radio telephone set comprising:

at least one control processor;

at least one signal processor; said at least one control processor and said at least one signal processor having operating modes that include an active mode and a not active mode; and a control unit which selects said operating modes of said at least one control processor in response to first request signals from said at least one control processor, and which selects said operating modes of said at least one signal processor in response to second request signals from said at least one signal processor.

2. A mobile radio telephone set as claimed in claim 1, wherein said at least control processor or said at least signal processor comprises at east two sub-blocks, and wherein the control unit selects one of said operation modes by switching on/off at least one of said at least two sub-blocks.

3. A mobile radio telephone set as claimed in claim 2, wherein said at least control processor or said at least signal processor transmits said first and second request signals to the control unit by signal buses.

4. A mobile radio telephone set as claimed in claim 2, wherein said at least control unit selects the operating modes in dependence of the first and second request signals by switching on/off supply clocks of said at least two sub-blocks.

5. A mobile radio telephone set as claimed in claim 4, wherein said at least two sub-blocks include a processor core supplied with a core clock and at least one interface supplied with an interface clock.

6. A mobile radio telephone set as claimed in claim 5, further comprising at least one wake-up counter which monitors said not active mode which is featured by switching-off said core clock and said interface clock, and transmits one of said first and second request signals for changing to said active mode of at least one of said at least one control processor and said at least one signal processor, wherein said active mode is featured by switching-on said core clock and said interface clock.

7. A mobile radio telephone set as claimed in claim 6, characterized in that the control unit switches off a reference clock for all the coupled processors when the core clock and interface clock are switched off.

8. A mobile telephone comprising:

a signal processor;

a control processor;

a clock generator unit which supplies a first clock to said signal processor and a second clock to said control processor;

a control unit which selects operating modes of said signal processor and said control processor in response to request signals from said signal processor and said control processor, said control unit switching on/off said first clock and said second clock in response to said request signals.

9. The mobile telephone of claim 8, wherein said first clock is provided from said clock generator unit to said signal processor on a first clock line and said second clock is provided from said clock generator unit to said control processor on a second clock line.

10. The mobile telephone of claim 8, wherein each of said signal processor and said control processor include a core and an interface, and each of said first clock and said second clock include a core clock and an interface clock.

11. The mobile telephone of claim 10, wherein said core clock and said interface clock are independently controlled by said control unit.

12. The mobile telephone of claim 10, wherein said core clock and said interface clock are switchably controlled by said control unit.

13. The mobile telephone of claim 8, wherein said first clock and said second clock are independently controlled by said control unit.

* * * * *